United States Patent
Yata

(10) Patent No.: US 8,363,108 B2
(45) Date of Patent: Jan. 29, 2013

(54) AUTOFOCUS SYSTEM

(75) Inventor: Kunio Yata, Saitama (JP)

(73) Assignee: FUJINON Corporation, Saitama-shi (JP)

( * ) Notice: Subject to any disclaimer, the term of this patent is extended or adjusted under 35 U.S.C. 154(b) by 427 days.

(21) Appl. No.: 12/634,241

(22) Filed: Dec. 9, 2009

(65) Prior Publication Data

US 2010/0157065 A1 Jun. 24, 2010

(30) Foreign Application Priority Data

Dec. 22, 2008 (JP) ................. P2008-326186

(51) Int. Cl.
*H04N 5/225* (2006.01)
*H04N 7/18* (2006.01)

(52) U.S. Cl. .......... 348/169; 348/143; 348/157; 396/77; 396/79

(58) Field of Classification Search ............. 348/169, 348/208.12, 345–346, 143, 157; 396/147, 396/102–104, 121–124, 80–93, 77, 79
See application file for complete search history.

(56) References Cited

U.S. PATENT DOCUMENTS

| | | | | |
|---|---|---|---|---|
| 5,003,339 A | * | 3/1991 | Kikuchi et al. | 396/100 |
| 5,694,625 A | * | 12/1997 | Watanabe et al. | 396/102 |
| 6,721,013 B1 | * | 4/2004 | Tsujino | 348/345 |
| 7,590,343 B2 | * | 9/2009 | Yata | 396/147 |
| 2004/0001158 A1 | * | 1/2004 | Aoki | 348/345 |
| 2006/0210260 A1 | | 9/2006 | Yata | |
| 2007/0211161 A1 | | 9/2007 | Okamoto | |
| 2008/0137215 A1 | * | 6/2008 | Nurishi | 359/698 |
| 2008/0181460 A1 | | 7/2008 | Tamaru | |
| 2009/0322894 A1 | | 12/2009 | Abe | |
| 2010/0189427 A1 | * | 7/2010 | Ilya et al. | 396/95 |

FOREIGN PATENT DOCUMENTS

| | | |
|---|---|---|
| EP | 1 703 723 A2 | 9/2006 |
| EP | 1 909 229 A2 | 4/2008 |
| EP | 1 968 310 A2 | 9/2008 |
| JP | 2006-258944 A | 9/2006 |
| JP | 2008-123416 A | 5/2008 |
| JP | 2008-170845 A | 7/2008 |
| JP | 2008-187332 A | 8/2008 |

OTHER PUBLICATIONS

European Search Report, Mar. 2, 2010.

* cited by examiner

*Primary Examiner* — David Lazaro
(74) *Attorney, Agent, or Firm* — Birch, Stewart, Kolasch & Birch, LLP

(57) ABSTRACT

An autofocus system includes: an image pickup unit; an autofocus unit performing focus adjustment such that a subject in a AF area is to be in focus in the photographing image; a tracking unit moving the AF area to follow the movement of the subject in the range of the photographing image; a reference pattern registering unit registering the subject image in focus as a reference pattern; and a matched image detecting unit detecting a subject which is most closely matched with the reference pattern in the photographing image. When the amount of movement of the detected subject in a screen is less than a given value, the reference pattern is updated with the image of the subject, and an AF frame is updated to follow the moved subject. When the amount of movement is equal to or more than the given value, a tracking operation stops.

6 Claims, 5 Drawing Sheets

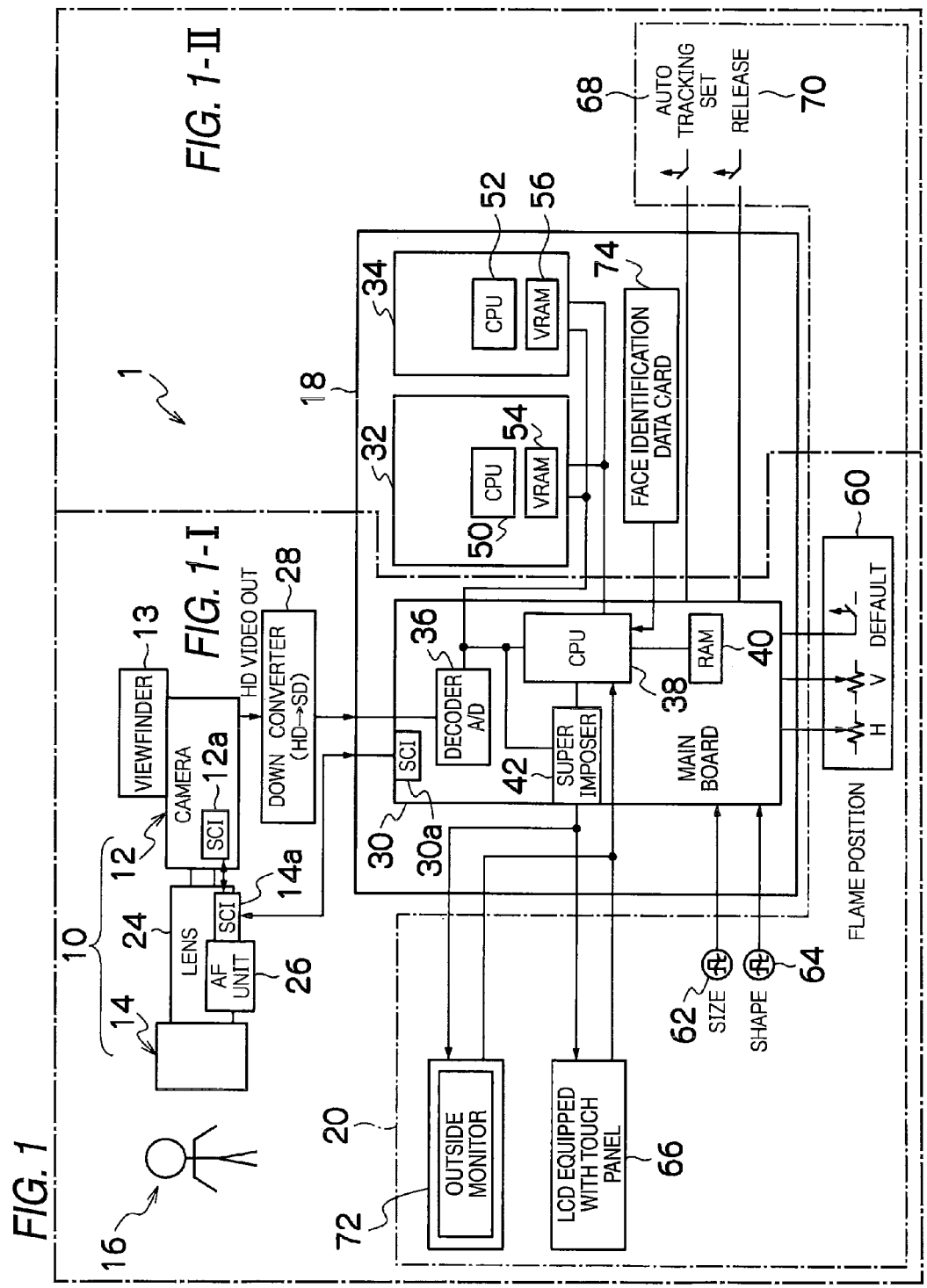

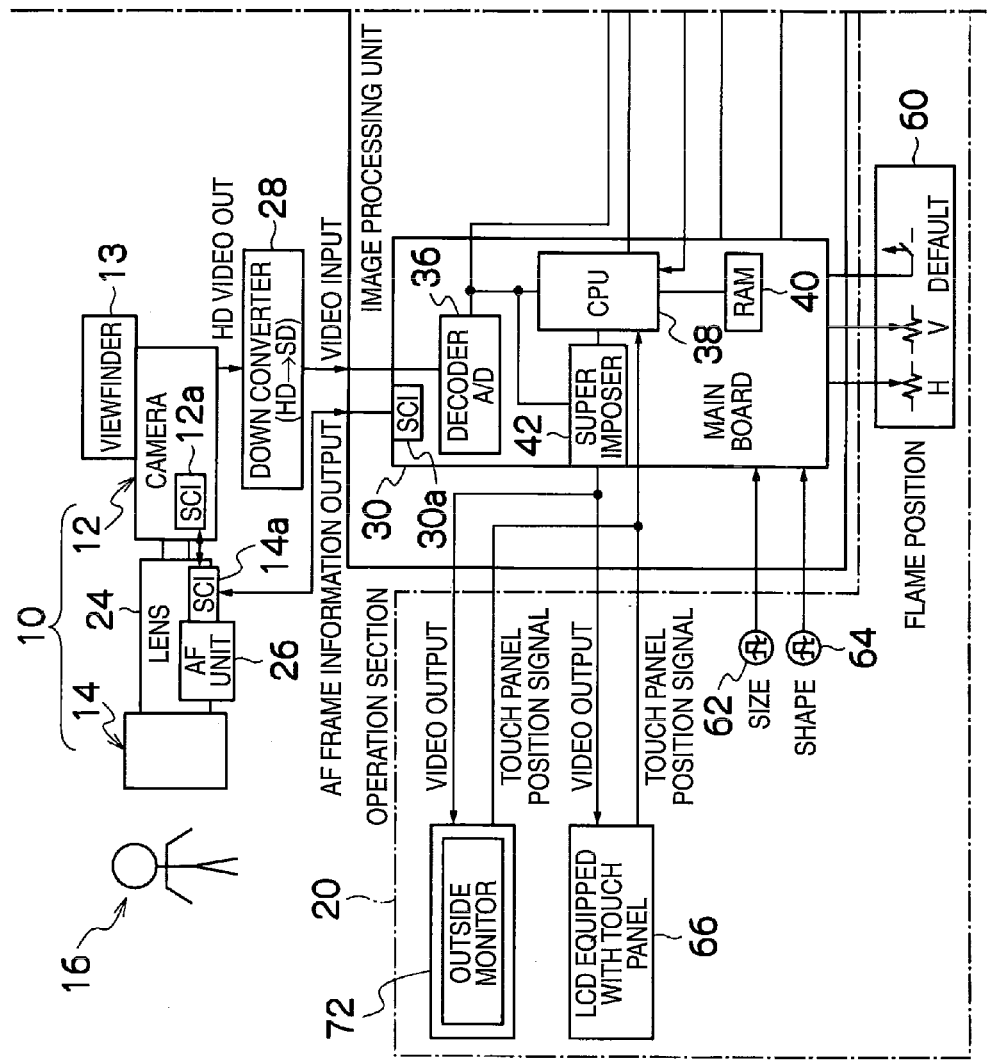
FIG. 1-I

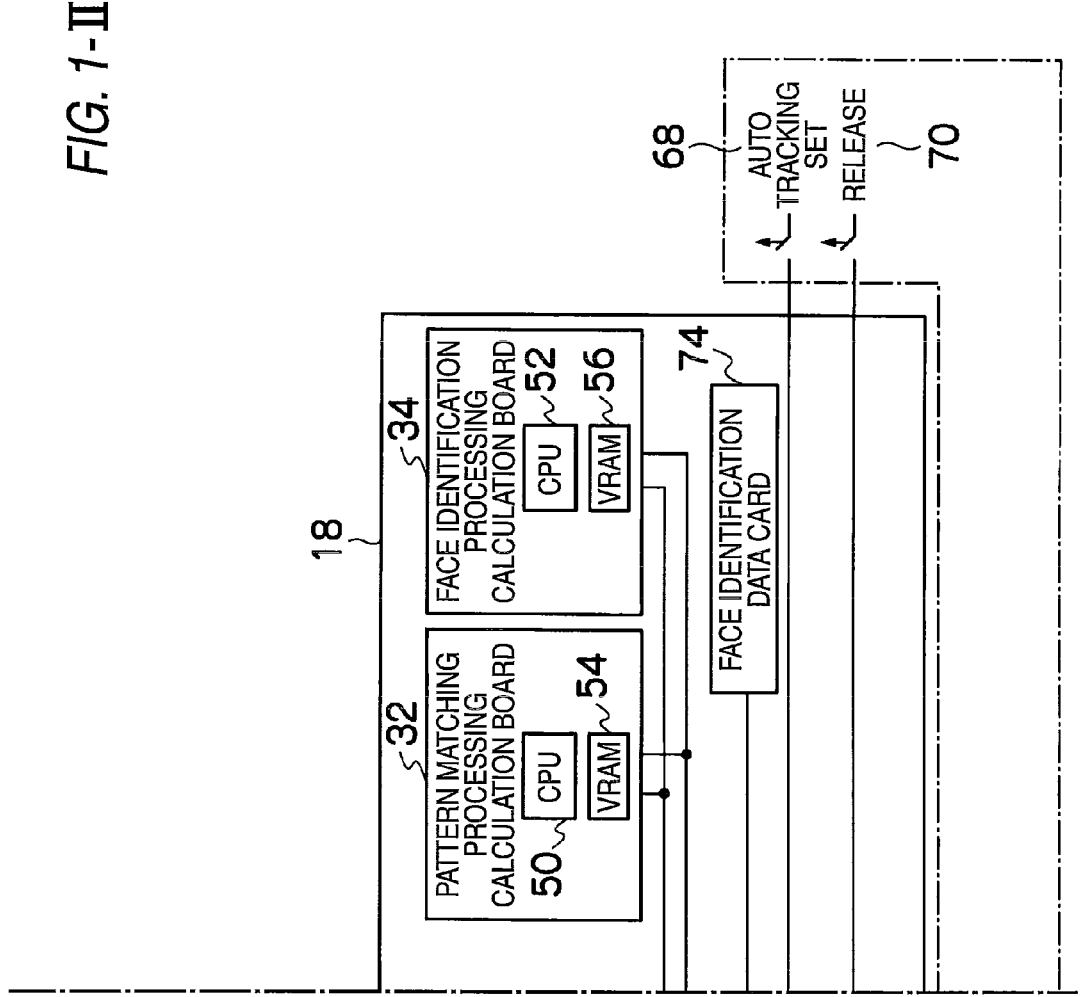

US 8,363,108 B2

AUTOFOCUS SYSTEM

CROSS-REFERENCE TO RELATED APPLICATIONS

This application is based on and claims priority under 35 USC 119 from Japanese Patent Application No. 2008-326186 filed on Dec. 22, 2008; the entire of which are incorporated herein by reference.

BACKGROUND

1. Technical Field

The present invention relates to an autofocus system, and more particularly, to a system that automatically tracks an AF frame using pattern matching.

2. Related Art

In the autofocus (AF) systems according to the related art that automatically focus cameras, it is necessary to control the camera to be focused (control the focus position of the camera). In this case, in a general camera, a focus position is fixed to the center of an photographing range. For example, the camera is focused on a person who is disposed at the center of the photographing range. Therefore, as an autofocus (AF) type, a contrast type has been used which detects the contrast of a subject image from the image signals acquired by an image pickup device and controls the focus of an photographing lens such that the contrast becomes the maximum, thereby performing autofocus in a best focus state.

The range of a subject to be subjected to AF in the photographing range of the camera or the range of a subject to be subjected to AF on the screen of the photographing image taken by the camera when the photographing image is reproduced is referred to as an AF area, and a frame indicating the outline of the AF area is referred to as an AF frame.

However, for example, when a moving subject is taken, the fixed focus position causes problems. For example, when a television camera is used to take a subject with a large amount of movement as in sports, in order to detect a target subject in focus from the photographing image and track the detected target subject, the following technique has been proposed which stores the image of a subject to be focused (focus target) as a reference pattern, detects an image that is most closely matched with the reference pattern image from the photographing image of a newly loaded frame using pattern matching, and detects the position of a target subject (for example, see Patent Document 1 (JP-A-2006-258944 corresponding to US-A-2006/0210260)).

However, as in the related art, when pattern matching is used in an algorithm for automatically tracking the AF frame, for example, the following problems arise. When there is a plurality of similar patterns in the screen as in sports in which there is a plurality of players with in the same uniform, a tracking error is likely to occur.

SUMMARY

An object of the invention is to provide an autofocus system for automatically tracking an AF frame that is capable of reliably tracking a subject even when there is a plurality of similar patterns in a screen during the tracking of a person by pattern matching.

[1] According to an aspect of the invention, an autofocus system includes: an image pickup unit that takes an subject image formed by an optical system; an autofocus unit that performs focus adjustment of the optical system so as to bring into an subject in a predetermined AF area in a photographing image taken by the image pickup unit; a tracking unit that moves the AF area to follow a movement of the subject in a range of the photographing image taken by the image pickup unit; a reference pattern registering unit that registers as a reference pattern, an image of the subject which is to be in focus in the photographing image taken by the image pickup unit; and a matched image detecting unit that detects an subject which is most closely matched with the reference pattern in the photographing image taken by the image pickup unit. When an amount of movement of the subject detected by the matched image detecting unit in a photographing screen of the image pickup unit is less than a given value, the reference pattern is updated with the image of the subject that is currently detected, and an AF frame is updated to follow the moved subject. And when said amount of movement is equal to or more than the given value, the tracking unit stops a tracking operation.

With the configuration of [1], in the system for automatically tracking the AF frame, it is possible to reliably track a subject even when there is a plurality of similar patterns in the screen during the tracking of a person by pattern matching.

[2] According to the autofocus system of [1], when the tracking unit stops the tracking operation and thereafter the matched image detecting unit detects an image which is most closely matched with the reference pattern in the photographing image taken by the image pickup unit, the tracking unit may resume the tracking operation of an subject in the detected image.

With the configuration of [2], it is possible to resume the tracking of a subject even when the tracking is interrupted once.

[3] According to the autofocus system of [1] or [2], the given value may vary depending on a panning/tilting operation of the image pickup unit.

With the configuration of [3], it is possible to track a subject according to the photographing mode.

[4] According to the autofocus system of [1], [2]or [3], the image pickup unit may take photographing images with a predetermined period.

With the configuration of [4], it is possible to update the reference pattern with the latest image all the time.

As described above, according to the above-mentioned aspects of the invention, in a system for automatically tracking an AF frame, it is possible to reliably track a subject even when there is a plurality of similar patterns in a screen during the tracking of a person by pattern matching.

BRIEF DESCRIPTION OF THE DRAWINGS

FIG. 1 is a block diagram illustrating the overall structure of a video camera system according to an embodiment to which an autofocus system according to the invention is applied.

FIGS. 1-I and 1-II are partial block diagrams of FIG. 1.

DETAILED DESCRIPTION

Figure 2:
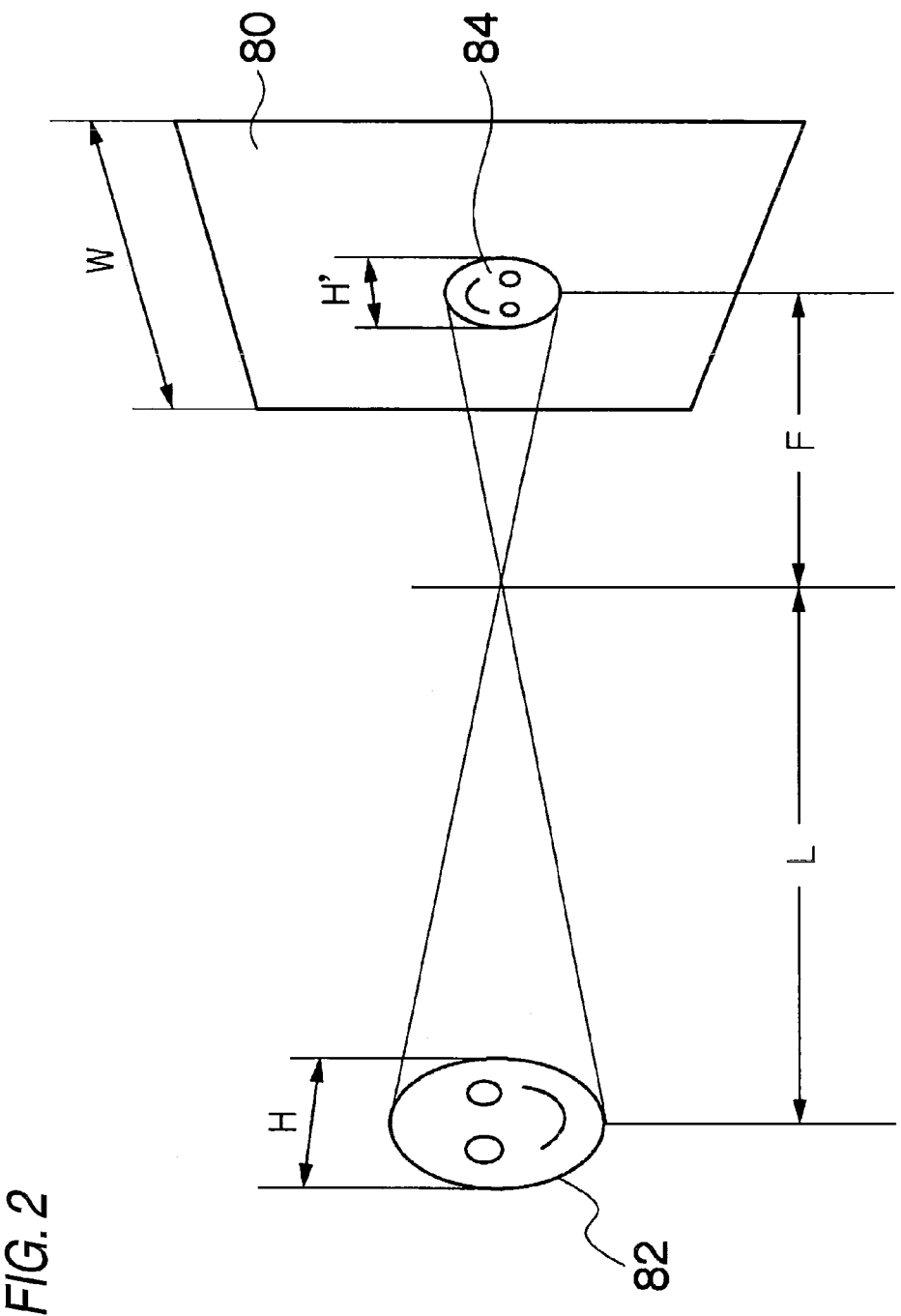
FIG. 2 is a diagram illustrating the amount of movement of a subject in a screen.

Hereinafter, an exemplary autofocus system according to the invention will be described in detail with reference to the accompanying drawings.

FIGS. 1, 1-I, and 1-II are block diagrams illustrating the overall structure of a video camera system according to an embodiment to which the autofocus system according to the invention is applied. The video camera system is a photographing system that is used to take images with, for example, a broadcasting television camera.

As shown in FIGS. 1, 1-I, 1-II, a video camera system 1 according to this embodiment includes, for example, a television camera 10 and an image processing unit 18.

The television camera 10 includes a camera main body 12, which is an HD camera corresponding to a high-definition television [HD TV] system, and a lens device 14 including an photographing lens (optical system) that is mounted to a lens mount of the camera main body 12. Although not shown in the drawings, the camera main body 12 is supported by a camera platform such that is can be moved in the pan and tilt direction.

For example, the camera main body 12 is provided with an image pickup device (for example, a CCD) and a predetermined signal processing circuit. The image formed by the photographing lens of the lens device 14 is converted into electric signals by the image pickup device, and the signal processing circuit performs predetermined signal processing on the electric signals to generate HDTV video signals (HDTV signals). The generated HDTV video signals are output from, for example, a video signal output terminal of the camera main body 12 to the outside.

The camera main body 12 also includes a viewfinder 13, and an image that is being currently taken by the television camera 10 is displayed on the viewfinder 13. In addition, various information items are displayed on the viewfinder 13. For example, an AF frame, which is a focus target range during autofocusing (which will be described below), is displayed so as to overlap a taken image.

The lens device 14 includes a photographing lens (zoom lens) 24 that is mounted to the lens mount of the camera main body 12. The photographing lens 24 focuses a subject 16 on the image pickup surface of the image pickup device of the camera main body 12. Although omitted in the drawings, the photographing lens 24 includes, as components, movable sections for adjusting photographing conditions, such as a focus lens group, a zoom lens group, and an aperture diaphragm. These movable sections are electrically driven by a motor (servomechanism). For example, the focus lens group and the zoom lens group are moved in the optical axis direction, focus adjustment (subject distance adjustment) is performed by the movement of the focus lens group, and the focal length adjustment (zoom ratio adjustment) is performed by the movement of the zoom lens group.

In the autofocus (AF) system, at least the focus lens group may be electrically driven, and the other movable sections may be manually driven. When predetermined movable sections are electrically driven in response to instructions from the operator, the operation of the movable sections is controlled on the basis of control signals output from an operating unit (not shown) (for example, an operating unit of a controller that is connected to the lens device 14) operated by the operator, but a detailed description thereof is omitted.

The lens device 14 is also equipped with an AF unit 26 and a lens CPU (not shown). The lens CPU controls the entire system of the lens device 14 overall. The AF unit 26 is a processing unit that acquires information required to focus control (autofocus adjustment) based on the AF, and includes an AF processing section (not shown) and an AF image pickup circuit (not shown). The AF image pickup circuit is disposed on the lens device 14 in order to acquire video signals for AF processing, and includes a processing circuit for outputting output signals of the image pickup devices such as CCD and the AF image pickup device as video signals of a predetermined format. Furthermore, the video signal output from the AF image pickup circuit is a brightness signal.

On the image pickup surface of the AF image pickup device, light of the subject is imaged which is diverged from light of the subject incident on the image pickup device of the camera main body 12 by a half mirror disposed in the optical path of the photographing lens 24. The photographing area and the subject distance (a distance at which the subject is brought into focus) relative to the image pickup area of the AF image pickup device is set to coincide with the photographing area and the subject distance relative to the image pickup area of the image pickup device of the camera main body 12. In addition, the subject image acquired by the AF image pickup device is set to coincide with the subject image acquired by the image pickup device of the camera main body 12. It is not necessary to make the both photographing areas perfectly coincide with each other. For example, the photographing area of the AF image pickup device may be a large area including the photographing area of the image pickup device of the camera main body 12.

The AF processing section acquires a video signal from the AF image pickup circuit, and calculates a focus evaluation value indicating the level of the contrast of the image of the subject on the basis of the video signal. For example, high-frequency component signals are extracted from the video signals obtained by the AF image pickup device by a high pass filter. Among the high-frequency component signals, signals that correspond to one screen (one frame) and are in a range corresponding to an AF area to be subjected to AF processing are integrated. The integrated value corresponding to each screen indicates the level of the contrast of the image of the subject, and is given as a focus evaluation value to the lens CPU.

The lens CPU acquires the information of AF frame (the AF frame information) representing the AF area (the outline) from the image processing unit 18 as described later, and allows the AF processing section to specify an area within the AF frame, which is specified by the AF frame information, as the AF area. Then, the focus evaluation value demanded for the image within the AF area (the video signal) is acquired from the AF processing section.

As described above, whenever the video signal per one screen is acquired from the AF image pickup circuit (whenever the AF processing section demands the focus evaluation value), the focus evaluation value is acquired from the AF processing section, and the focus lens group is controlled so that the acquired focus evaluation value becomes the maximum (the largest value), that is, the contrast of the subject image within the AF frame becomes the maximum. For example, the mountain climbing method is generally known as a control method of the focus lens group based on the focus evaluation value. In this method, when the first lens group is moved in a direction increasing the focus evaluation value and a point, at which the focus evaluation value begins to decrease, is detected, the focus lens group is set at this position. In such a manner, the subject within the AF frame is automatically brought into focus.

The above-mentioned AF processing section acquires the video signal from the AF image pickup device mounted in the lens unit in order to calculate the focus evaluation value. However, it may be possible to adopt a configuration in which the video signal of the video photographed by the image pickup device of the camera main body 12 is acquired from the camera main body 12. In addition, anything may be used as the AF unit for automatically bringing into focus the subject within the AF frame.

The camera main body 12 and the lens device 14, and the lens device 14 and the image processing unit 18, which will be described below, are connected to each other by serial communication connectors provided therein directly or through cables. The camera main body 12 and the lens device 14 are connected to each other by serial communication interfaces (SCI) 12*a* and 14*a* respectively provided therein such that various information items can be transmitted therebetween by serial communication. In addition, the lens device 14 and the image processing unit are connected to each other by serial communication interfaces 14*a* and 30*a* respectively provided therein such that various information items can be transmitted therebetween by serial communication.

A video output connector of the camera main body 12 and a video input connector of the image processing unit are connected to each other by a cable with a down converter 28 interposed therebetween. In this way, the HDTV signal output from the video output connector of the camera main body 12 is converted (down-converted) into a video signal (SDTV signal) of a standard television [NTSC (National Television System Committee)] format by the down converter 28, and the converted video signal is input to the image processing unit 18.

The image processing unit 18 performs pattern matching between a reference pattern and a person in the taken subject image. When it is checked that the person is a subject (focus target) that is set to be subjected to autofocusing and auto-tracking, the image processing unit controls the AF unit 26 to perform the autofocus control of the lens device 14, which will be described in detail below.

In addition, the image processing unit 18 may perform face identification to determine whether the subject being currently taken is to be subjected to autofocusing and auto-tracking. As such, a high-definition image composed of HDTV signals is not needed, but an image composed of video signals (SDTV signals) of a standard television system is sufficient in order to perform pattern matching or face identification. Therefore, as described above, the HDTV signal output from the camera main body 12 is converted into the SDTV signal by the down converter 28.

As described above, the image processing unit 18 designates the range (the position, size, and shape (aspect ratio)) of the AF frame when the AF unit 26 of the lens device 14 performs AF control. The image processing unit 18 transmits AF frame information designating the range of the AF frame in the photographing image (photographing screen) taken by the television camera 10 to the lens device 14 using the serial communication. The AF unit 26 sets the range of the AF frame on the basis of the AF frame information transmitted from the image processing unit 18, and performs AF processing as described above.

The image processing unit 18 mainly includes a main board 30, a pattern matching processing calculation board 32, and a face identification processing calculation board 34. The main board 30, the pattern matching processing calculation board 32, and the face identification processing calculation board 34 respectively include CPUs 38, 50, and 52 such that the boards individually perform operating processes. In addition, the CPUs 38, 50, and 52 are connected to each other by a bus or a control line such that they perform data communication therebetween or the operating processes are synchronized with each other. In addition, the image processing unit 18 further includes a face identification data card 74 that stores face identification data subjected to a face identification process.

The main board 30 controls the overall operation of the image processing unit 18. The main board 30 includes an SCI 30*a*, a decoder (A/D converter) 36, a superimposer 42, and a RAM 40 in addition to the CPU 38 that performs an operating process.

As described above, the SCI 30*a* is an interface circuit for serial communication with the SCI 14*a* of the lens device 14, and transmits, for example, the AF frame information to the lens device 14.

The decoder 36 is a circuit for converting the video signal (SDTV signal) of the image taken by the television camera 10, which is input from the down converter 28 to the image processing unit 18, into digital data that can be processed by the image processing unit 18, and performs an A/D converting process of converting an analog SDTV signal into a digital video signal.

The RAM 40 is a memory that temporarily stores data used in the operating process of the CPU 38.

The pattern matching processing calculation board 32 and the face identification processing calculation board are arithmetic boards that individually perform a pattern matching process and a face detection and authentication process, and include, for example, VRAMs 54 and 56 that temporarily store image data, in addition to the CPUs 50 and 52 that perform the operating processes, respectively.

The operation section 20 is provided integrally with the image processing unit 18, or some or all of the operating members of the operation section 20 are provided separately from the image processing unit 18 and are connected to the image processing unit 18 by, for example, cables.

The operation section 20 includes a position operating member 60 (for example, a joystick or a trackball) that is manually operated by the user to move the position of the AF frame in the horizontal and vertical directions, a size operating member 62 (for example, a knob) that is manually operated by the user to change the size of the AF frame, a shape operating member (for example, a knob) that is manually operated by the user to change the shape of the AF frame, a tracking start switch 68 that instructs the start of auto-tracking, and a tracking stop switch 70 that instructs the stopping of the auto-tracking. A detailed description of the operating members will be omitted. The CPU 38 of the main board 30 of the image processing unit 18 reads the set states of the operating members 60, 62, 64, 68, and 70.

The user touches a LCD equipped with touch panel 66 to set the mode related to AF frame auto-tracking. The image displayed on the LCD equipped with touch panel 66 by the CPU 38 of the image processing unit 18 is appropriately changed depending on the set conditions.

The image displayed on the LCD equipped with touch panel 66 is transmitted from the superimposer 42 of the main board 30. The superimposer 42 composes the video signal of the image taken by the television camera 10, which is transmitted from the decoder 36, and the image signal generated by the CPU 38. In this way, it is possible to simultaneously display a superimposed image of the image taken by the television camera 10 and the image currently set in the AF frame on the viewfinder 13 set in the camera main body 12 and the LCD equipped with touch panel 66. The user can touch the screen to perform the same operation as that performed by the operating members 60, 62, 64, 68, and 70.

The operation section 20 includes an outside monitor 72 in addition to the LCD equipped with touch panel 66. The same image as that displayed on the LCD equipped with touch panel 66 is displayed on the outside monitor 72. For example, a focus puller other than the camera man may view the outside monitor 72 and use a touch panel function to input appropriate instructions.

In this embodiment, in the AF frame auto-tracking system, when there is a plurality of similar patterns in the screen during the tracking of a subject by pattern matching, data with a large amount of movement in the screen is neglected. In this way, it is possible to prevent a tracking error.

The point of the invention that neglects data with a large amount of movement in the screen will be described with reference to FIG. 2.

As shown in FIG. 2, a subject image 84 of an subject 82 is formed on an photographing screen 80. In FIG. 2, the subject 82 is a person's face, and it is preferable that the size of the subject image 84 is about one-eighth of the size of the photographing screen 80.

It is assumed that the photographing screen 80 has an image size of ⅔". In this case, the width W of the photographing screen 80 in the horizontal direction is 9.59 mm. The number of pixels (image processing pixels) is 640. In addition, the width H of the face of the subject 82 is 200 mm and a subject distance L is 10 m (10000 mm).

When a photographing process is performed under the above-mentioned conditions such that the width H' of the face of the subject image 84 is one-eighth of the width W of the photographing screen 80, a focal length f is calculated by the following expression: $f=L \times H'/H$. When the above-mentioned numerical values are substituted into the expression, the following is obtained.

That is, the focal length f is about 60 mm ($=10000 \times (9.59/8)/200=59.9375$).

When the subject is a person, the maximum movement speed of the subject is about 10 m/sec. The transmission rate of a general television camera is 30 frames/sec. Therefore, when the movement speed is 10 m/sec, the subject is moved by a distance of 330 mm (10/30=0.33 m) at one frame.

For example, when the symbols shown in FIG. 2 are used, the movement distance (the amount of movement) of the subject on the photographing screen 80 may be calculated by the following expression: $H'=H \times f/L$.

When the above-mentioned values are substituted into the expression, the following is obtained: $H'=330 \times 60/10000=1.98$ mm.

The above-mentioned value corresponds to 132 pixels ($=1.98 \times 640/9.59$). That is, the person can be moved by a distance corresponding to 132 pixels in the photographing screen at one frame at a maximum speed. Under these conditions, the television camera is panned to follow the person. Therefore, the number of pixels is reduced.

As such, when the person is tracked, the person is moved by 132 pixels on the photographing screen at the most. Therefore, for example, when there is a plurality of players in the same uniform on the screen and the AF frame is disposed at the center of the screen where there is a tracking target, it is difficult for the person to move from the center of the screen to the end of the screen at a high speed even when one of the players in the same uniform who is disposed at the end of the screen is determined to be a tracking target due to a tracking error.

When the person is tracked by pattern matching, it is determined that the amount of movement of the person is large at one frame (for example, 100 pixels or more) only when a tracking error occurs. Therefore, it is possible to prevent similar subjects from being tracked.

Next, the operation of this embodiment will be described with reference to the flowchart.

Figure 3:
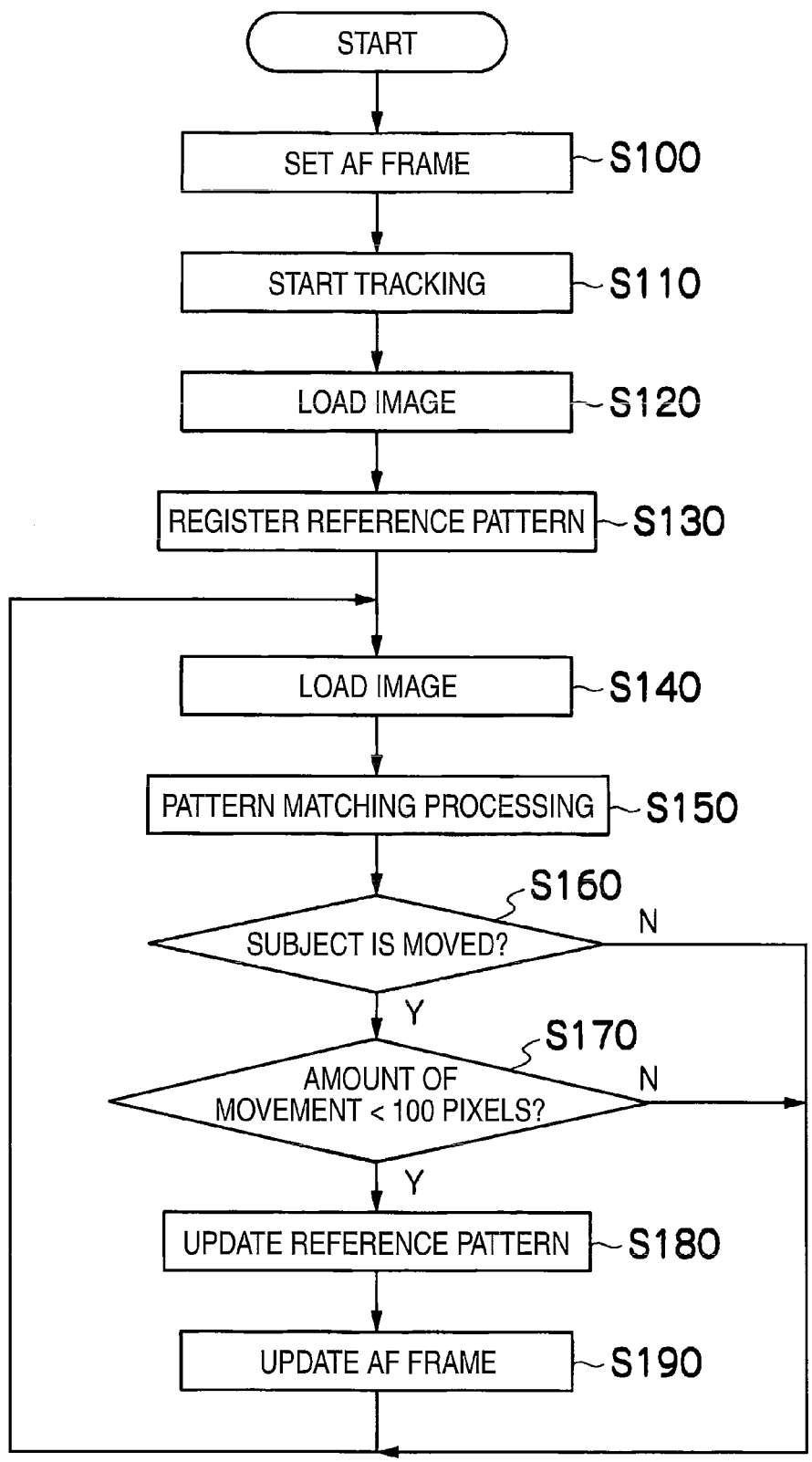
FIG. 3 is a flowchart illustrating the operation of this embodiment.

FIG. 3 is a flowchart illustrating the operation of this embodiment.

First, in Step S100 of FIG. 3, when the camera man starts taking a picture, the camera man operates the operating members, such as the position operating member 60, the size operating member 62, and the shape operating member 64 of the operation section 20, while viewing the AF frame and the image displayed on the screen of the viewfinder 13 or the LCD equipped with touch panel 66 to set the range of the AF frame such that an subject to be tracked as a focus target is within the range of the AF frame. Then, the camera is focused on the subject by the AF processing operation of the lens CPU of the lens device 14.

When tracking starts in Step S110, in Step S120, the CPU 38 of the image processing unit 18 loads an photographing image corresponding to one screen (one frame) from the video signals transmitted from the AF unit 26 (AF processing section) of the lens device 14.

Then, in Step S130, a buffer for registering the reference pattern used for pattern matching is ensured, and an image, which is a tracking target, obtained from the loaded photographing image is stored to register the reference pattern.

Then, in Step S140, the image processing unit 18 loads a photographing image corresponding to one screen by the same method as described above after a predetermined amount of time has elapsed after the previous image loading process.

Then, in Step S150, the pattern matching processing calculation board 32 of the image processing unit 18 performs pattern matching between the currently loaded photographing image and the reference pattern.

Then, in Step S160, the CPU 38 of the main board 30 in the image processing unit 18 determines whether the subject is moved in the photographing screen on the basis of the result of the pattern matching.

When it is determined that the subject is moved, in Step S170, the CPU 38 determines whether the amount of movement is less than 100 pixels. Since the previous position of the subject in the photographing screen is registered as the latest image in the reference pattern, the CPU 38 of the main board 30 in the image processing unit 18 calculates the amount of movement of the subject in the photographing screen with respect to the currently detected reference pattern of the subject, on the basis of the result of the pattern matching of the pattern matching processing calculation board 32.

When the amount of movement of the subject in the photographing screen is less than 100 pixels, in Step S180, the reference pattern of the latest photographing image subjected to the pattern matching is updated. In addition, in Step S190, the AF frame is updated to follow the moved subject.

If it is determined in Step S160 that the subject is not moved in the photographing screen, neither the reference pattern nor the AF frame is updated and the process returns to Step S140 to load the next photographing image.

If it is determined that the subject is moved in the photographing screen and if it is determined in Step S170 that the amount of movement in the photographing screen is equal to or more than 100 pixels, it is determined that there is an error and the tracking operation stops. In addition, neither the reference pattern nor the AF frame is updated and the process returns to Step S140 to load the next photographing image. Then, when a tracking target is detected from the loaded photographing image by pattern matching, the tracking operation is resumed.

In Step S170, the reference value for determining whether the amount of movement of the subject in the photographing screen is large is 100 pixels, but the invention is not limited thereto. For example, when the camera is panned to track the person, the number of pixels moved is reduced. For example, the reference value may vary depending on the panning or tilting operation. For example, 70 to 80 pixels smaller than 100 pixels may be used as the reference value.

As described above, in this embodiment, when it is determined that the amount of movement of the subject in the photographing screen is large on the basis of the result of pattern matching, it is determined that there is an error. Therefore, when there is a plurality of similar patterns in the photographing screen, it is possible to prevent a subject similar to a tracking target from being tracked.

Although the autofocus system according to the above-described embodiment of the invention has been described above, the invention is not limited thereto, but various modifications and changes of the invention can be made without departing from the scope and spirit of the invention.

What is claimed is:

1. An autofocus system comprising:
an image pickup unit that takes an subject image formed by an optical system;
an autofocus unit that performs focus adjustment of the optical system so as to bring into an subject in a predetermined auto focusing (AF) area in each of photographing images taken by the image pickup unit;
a tracking unit that moves the AF area to follow a movement of the subject in a range of a photographing screen of the image pickup unit;
a reference pattern registering unit that registers as a reference pattern, an image of the subject which is to be in focus in the photographing images taken by the image pickup unit; and
a matched image detecting unit that detects an subject which is matched with the reference pattern in each of the photographing images taken by the image pickup unit,
wherein, when an amount of movement of the subject detected by the matched image detecting unit in the photographing screen of the image pickup unit is less than a given value, the reference pattern is updated with the image of the subject that is currently detected, and an AF frame is updated to follow the moved subject, and
when said amount of movement is equal to or more than the given value, the tracking unit stops a tracking operation.

2. The autofocus system according to claim 1, wherein, when the tracking unit stops the tracking operation and thereafter the matched image detecting unit detects an image which is most closely matched with the reference pattern in the photographing image taken by the image pickup unit, the tracking unit resumes the tracking operation of an subject in the detected image.

3. The autofocus system according to claim 2, wherein the given value varies depending on a panning/tilting operation of the image pickup unit.

4. The autofocus system according to claim 3, wherein the image pickup unit takes photographing images with a predetermined period.

5. The autofocus system according to claim 1, wherein the given value varies depending on a panning/tilting operation of the image pickup unit.

6. The autofocus system according to claim 1, wherein the image pickup unit takes photographing images with a predetermined period.

* * * * *